United States Patent
Ichimura et al.

(10) Patent No.: US 9,663,681 B2
(45) Date of Patent: May 30, 2017

(54) INTERMEDIATE COATING COMPOSITION, MULTILAYERED COATING FILM, AND METHOD FOR FORMING THE MULTILAYERED COATING FILM

(71) Applicants: NIPPON PAINT CO., LTD., Osaka-shi (JP); TOYOTA JIDOSHA KABUSHIKI KAISHA, Toyota-shi (JP)

(72) Inventors: Hideki Ichimura, Neyagawa (JP); Takashi Irie, Neyagawa (JP); Yoshikazu Kasahara, Neyagawa (JP); Yoshinobu Watanabe, Toyota (JP); Masahiko Ishii, Okazaki (JP); Eisaku Okada, Okazaki (JP)

(73) Assignees: NIPPON PAINT AUTOMOTIVE COATINGS CO., LTD., Hirataka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 52 days.

(21) Appl. No.: 14/662,826

(22) Filed: Mar. 19, 2015

(65) Prior Publication Data
US 2015/0275037 A1   Oct. 1, 2015

(30) Foreign Application Priority Data

Mar. 26, 2014 (JP) ................................. 2014-064860
Feb. 16, 2015 (JP) ................................. 2015-028104

(51) Int. Cl.
| | | |
|---|---|---|
| *C09D 175/06* | (2006.01) | |
| *C25D 7/00* | (2006.01) | |
| *C25D 5/48* | (2006.01) | |
| *C08K 3/34* | (2006.01) | |
| *C08G 18/58* | (2006.01) | |
| *C09D 175/04* | (2006.01) | |
| *C08G 18/40* | (2006.01) | |
| *C08G 18/42* | (2006.01) | |
| *C25D 13/12* | (2006.01) | |
| *C25D 13/22* | (2006.01) | |

(52) U.S. Cl.
CPC ....... *C09D 175/06* (2013.01); *C08G 18/4045* (2013.01); *C08G 18/4269* (2013.01); *C08G 18/58* (2013.01); *C09D 175/04* (2013.01); *C25D 13/12* (2013.01); *C25D 13/22* (2013.01); *Y10T 428/31551* (2015.04)

(58) Field of Classification Search
CPC ............ C08G 18/4045; C08G 18/4269; C08G 18/4277; C08G 18/58; C09D 175/04; C09D 175/06; C09D 175/12; C25D 13/12; C25D 13/22; Y10T 428/31551

USPC ...................................................... 428/423.1
See application file for complete search history.

(56) References Cited

U.S. PATENT DOCUMENTS

| | | | | |
|---|---|---|---|---|
| 6,180,175 B1 * | 1/2001 | Saika | ..................... | B05D 7/532 427/387 |
| 6,855,779 B1 * | 2/2005 | Nagata | ................. | C08G 18/544 427/385.5 |
| 2003/0158321 A1 * | 8/2003 | Watanabe | .......... | C08G 18/8093 524/449 |

FOREIGN PATENT DOCUMENTS

| | | | | |
|---|---|---|---|---|
| GB | 2287469 A | * | 9/1995 | ............... B05D 7/56 |
| JP | 63-122768 A | | 5/1988 | |
| JP | 4-77580 | | 3/1992 | |
| JP | 6-41494 | | 2/1994 | |
| JP | 6-93227 | | 4/1994 | |
| JP | 6-322059 | | 11/1994 | |
| JP | 6-346024 | | 12/1994 | |
| JP | 7-228834 | | 8/1995 | |
| JP | 8-269395 A | | 10/1996 | |
| JP | 9-241580 | | 9/1997 | |
| JP | 2001-64589 A | | 3/2001 | |
| JP | 2002-180000 | | 6/2002 | |
| JP | 2004-50063 A | | 2/2004 | |
| JP | 2010-82554 | | 4/2010 | |
| JP | 4477483 | | 6/2010 | |
| JP | 2011-20104 | | 2/2011 | |
| JP | 2011-50916 | | 3/2011 | |
| JP | 2014-80569 | | 5/2014 | |

OTHER PUBLICATIONS

U.S. Appl. No. 14/662,750, filed Mar. 19, 2015, Ichimura, et al.

* cited by examiner

*Primary Examiner* — Thao T Tran
(74) *Attorney, Agent, or Firm* — Oblon, McClelland, Maier & Neustadt, L.L.P.

(57) ABSTRACT

An intermediate coating composition used in forming an intermediate coating layer directly overlaid on a surface of an electrodeposition coating layer constructing a vehicle outer panel, the coating composition containing as resin components: (a) 1% to 27% by mass of a polycaprolactonetriol; (b) 20% to 60% by mass of a blocked isocyanate; and (c) 1% to 20% by mass of a melamine resin, each at a percentage content in entire resin components, and the coating composition further containing as a pigment component: (d) 1% to 10% by mass of talc in terms of pigment mass concentration. As the resin component, (e) greater than 0% to 10% by mass of an epoxy resin is preferably contained. A urethane curing catalyst is preferably contained in an amount of greater than 0.01 parts to 2 parts by mass with respect to 100 parts by mass of the entire resin components.

18 Claims, No Drawings

INTERMEDIATE COATING COMPOSITION, MULTILAYERED COATING FILM, AND METHOD FOR FORMING THE MULTILAYERED COATING FILM

BACKGROUND OF THE INVENTION

Field of the Invention

The present invention relates to an intermediate coating composition, a multilayered coating film, and a method for forming the multilayered coating film.

Discussion of the Background

For example, in a high-speed operation of automobiles, collision of pebbles and the like onto painted faces of outer panels of the automobiles is inevitable. Due to the collision of the pebbles and the like, damaging phenomena such as cracking and flaking on the coating film of the vehicle outer panel (chipping, as generally referred to) may be caused. When such chipping is caused, water and the like would penetrate from this area, and thus rusting of the foundation material of the outer panel may be caused.

Particularly, in cold foreign countries such as North America, Canada and North Europe, a large amount of rock salts and sand are dispersed on the road surface in winter season for thawing snow; therefore, chipping resistance on coating films of outer panels of automobiles, in particular, is important, and coating films not accompanied by breakage, flaking and the like of the coating film even if pebbles collided have been desired, whereby the foundation materials of vehicle outer panels would be prevented from rusting.

In general, in paint application of outer panels of automobiles, an electrodeposition paint (undercoating paint), an intermediate coating paint and a top coating paint are sequentially applied on a steel plate which had been subjected to iron phosphate/zinc phosphate chemical conversion coating. In order to improve chipping resistance and in turn, a rust-preventive property, chipping-resistant primers to be applied between an electrodeposition coating layer and an intermediate coating layer, and the like have been developed (see, Japanese Unexamined Patent Application, Publication Nos. H6-41494, H6-93227, H6-322059, H6-346024, H7-228834, H9-241580 and 2002-180000). However, coating of these chipping-resistant primers may result in an increase in production cost, contrary to demands for the present, i.e., a reduction in cost.

On the other hand, a technique of imparting chipping resistance to the intermediate coating layer was also developed (see, Japanese Unexamined Patent Application, Publication Nos. H4-77580 and 2011-50916). However, these techniques also fail to attain sufficient chipping resistance under the current situation.

Therefore, in the paint application of outer panels of automobiles, more superior chipping resistance is desired for the intermediate coating layer. The same applies to external paint application of motor cycles, automobile accessories, fork-lift trucks, heavy equipment, and the like.

PRIOR ART DOCUMENTS

Patent Documents

Patent Document 1: Japanese Unexamined Patent Application, Publication No. H6-41494
Patent Document 2: Japanese Unexamined Patent Application, Publication No. H6-93227
Patent Document 3: Japanese Unexamined Patent Application, Publication No. H6-322059
Patent Document 4: Japanese Unexamined Patent Application, Publication No. H6-346024
Patent Document 5: Japanese Unexamined Patent Application, Publication No. H7-228834
Patent Document 6: Japanese Unexamined Patent Application, Publication No. H9-241580
Patent Document 7: Japanese Unexamined Patent Application, Publication No. 2002-180000
Patent Document 8: Japanese Unexamined Patent Application, Publication No. H4-77580
Patent Document 9: Japanese Unexamined Patent Application, Publication No. 2011-50916

SUMMARY OF THE INVENTION

The present invention was made in view of the foregoing circumstances, and an object of the invention is to provide an intermediate coating composition which enables a multilayered coating film having superior and well-harmonized chipping resistance and other characteristic features such as an appearance to be formed, without using a chipping-resistant primer.

According to an aspect of the present invention made for solving the aforementioned problems, an intermediate coating composition used in forming an intermediate coating layer directly overlaid on a surface of an electrodeposition coating layer constructing a vehicle outer panel, the coating composition comprising as resin components: (a) a polycaprolactonetriol in an amount of no less than 1% by mass and no greater than 27% by mass; (b) a blocked isocyanate in an amount of no less than 20% by mass and no greater than 60% by mass; and (c) a melamine resin in an amount of no less than 1% by mass and no greater than 20% by mass, each at a percentage content in entire resin components, and the coating composition further comprising as a pigment component: (d) talc in an amount of no less than 1% by mass and no greater than 10% by mass in terms of pigment mass concentration.

According to another aspect of the present invention made for solving the aforementioned problems, a multilayered coating film comprises: an electrodeposition coating layer constructing a vehicle outer panel; an intermediate coating layer directly overlaid on a surface of the electrodeposition coating layer; and a top coating layer overlaid on a surface of the intermediate coating layer, wherein the intermediate coating layer is formed from the intermediate coating composition.

According to yet another aspect of the present invention made for solving the aforementioned problems, a multilayered coating film-forming method includes the steps of: forming an electrodeposition coating layer constructing a vehicle outer panel; directly forming an intermediate coating layer overlaid on the surface of the electrodeposition coating layer; and forming a top coating layer overlaid on the surface of the intermediate coating layer, wherein the intermediate coating composition described above is applied in the step of forming the intermediate coating layer.

The term "melamine resin" as referred to means an initial condensate of an aldehyde with melamine, with a mass average molecular weight thereof being no less than 300 and no greater than 2,000. The term "pigment mass concentration" as referred to means a value (% by mass) calculated in accordance with a formula of: (mass of pigment)×100/{(mass of entire pigment components)+(mass of entire resin components in terms of solid content equivalent)}. The "percentage content in entire resin components" as referred to means a percentage content in the entire resin components, in terms of solid content equivalent.

Effects of the Invention

According to the intermediate coating composition, the multilayered coating film and the multilayered coating film-forming method of the aspects of the present invention, a multilayered coating film having superior and well-harmonized chipping resistance and other characteristic features such as an appearance can be formed without an application of a chipping-resistant primer.

DESCRIPTION OF EMBODIMENTS

The embodiments of the present invention involve an intermediate coating composition, a multilayered coating film and a multilayered coating film-forming method, and these will be explained below.

Intermediate Coating Composition

The intermediate coating composition according to the embodiment of the present invention is used for providing an intermediate coating layer directly overlaid on the surface of an electrodeposition coating layer constructing a vehicle outer panel.

The intermediate coating composition contains as resin components: (a) a polycaprolactonetriol; (b) a blocked isocyanate; and (c) a melamine resin, and further contains (d) talc as a pigment component. In addition, the intermediate coating composition may contain, as favorable component(s), (e) an epoxy resin and (f) a polyester resin as resin component(s), or as other component, (g) a urethane curing catalyst. Furthermore, other optional component(s) may be also contained within a range not leading to impairment of the effects of the present invention.

Due to containing the polycaprolactonetriol (a), the blocked isocyanate (b) and the melamine (c) resin as resin components, the intermediate coating composition will provide a urethane resin having a comparatively dense three-dimensional network structure having many crosslinking points. Thus, the intermediate coating layer formed from the intermediate coating composition has superior flexibility and elasticity, and in turn, is expected to be capable of providing superior cushioning characteristics. These features enable the intermediate coating composition to form an intermediate coating layer having superior chipping resistance. In addition, due to containing talc having a layer structure in the aforementioned certain amount, the intermediate coating composition enables the toughness of the intermediate coating layer to be improved, also leading to enhanced chipping resistance.

The melamine resin has not only crosslinkability with a resin that serves as a base substance, but also a self-condensation property. Therefore, in a case where a melamine resin is used alone as a curing agent, self condensation of the melamine resin partially proceeds in preference, whereby a coating film having nonuniform viscoelasticity and crosslinking properties is likely to be formed. On the other hand, since crosslinking of the blocked isocyanate with a base substance resin preferentially proceed, a comparatively uniform coating film is likely to be formed. Due to containing the blocked isocyanate (b) and the melamine resin (c) together as the curing agent, the intermediate coating composition forms an even cured coating film having improved uniformity of strength, etc. Accordingly, flaking of the coating film together with a plating of the material to be coated upon chipping, etc., can be inhibited, and thus an exposure of the material to be coated (foundation material) such as a steel plate through chipping can be inhibited. Each component will be explained below.

(a) Polycaprolactonetriol

The polycaprolactonetriol (a) is a compound having, for example, a structure represented by the following formula. The polycaprolactonetriol (a) represented by the following formula may be obtained by, for example, adding ε-caprolactone to a triol.

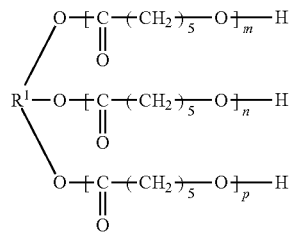

In the above formula, $R^1$ represents a group derived from a triol; m and n are each independently an integer of 0 or greater; and p is an integer of 1 or greater, wherein the sum of m, n and p is 2 or greater.

Examples of the group derived from a triol represented by $R^1$ include a 2,2-dimethylbutane-triyl group, a propane-1,2, 3-triyl group, a triethylamine-triyl group, and the like.

Examples of the triol that gives $R^1$ include trimethylolpropane, glycerin, triethanolamine, and the like. The triol preferably has carbon atoms of preferably no less than 2 and no greater than 8, and more preferably no less than 3 and no greater than 6.

The lower limit of the number average molecular weight (Mn) of the polycaprolactonetriol (a) is preferably 200, and more preferably 400. The upper limit of the number average molecular weight is preferably 4,000, and more preferably 3,000. When the number average molecular weight falls within such a range, chipping resistance can be improved. It is to be noted that the number average molecular weight as referred to herein is a value as determined by gel permeation chromatography using mono-dispersed polystyrene as a standard.

As the polycaprolactonetriol (a), a commercially available product may be also used. Examples of the commercially available product of the polycaprolactonetriol (a) include "PLACCEL 303", "PLACCEL 305", "PLACCEL 308", "PLACCEL 309", "PLACCEL 312" and "PLACCEL 320" (Daicel Chemical Industries, Ltd.,) and the like.

The lower limit of the percentage content of the polycaprolactonetriol (a) in the entire resin components is 1% by mass, preferably 2.5% by mass, and more preferably 5% by mass. The upper limit of the percentage content is 27% by mass, preferably 15% by mass, and more preferably 10% by mass. When the percentage content is less than the lower limit described above, chipping resistance will be inferior, whereby flaking of the coating film may be caused. To the contrary, when the percentage content exceeds the upper limit described above, the hardness of the coating film may be decreased. In addition, when the percentage content of the polycaprolactonetriol (a) falls within the above range, the loss tangent (tan δ) value, degree of elongation and Young's modulus at a low temperature can be optimized, and also the dynamic glass transition temperature (dynamic Tg) can be optimized. Therefore, flaking of the coating film together with the plating of the material to be coated upon chipping, etc., can be inhibited, and thus an exposure of the material to be coated (foundation material) such as a steel plate through chipping can be inhibited. The "loss tangent (tan δ) value" is a value that indicates a ratio of the viscosity to the elasticity, i.e., a value indicating a ratio of absorption of a thermal energy converted from a dynamic energy applied through viscous deformation that occurs when a certain external force is imparted to a target substance. In other words, a coating film having a greater loss tangent (tan δ) suggests that a greater ratio of absorption (consumption) of an external energy as a thermal energy is attained. As referred to herein, the "loss tangent (tan δ)" is a value as determined in accordance with a tensile vibration-non-resonance method specified in JIS-K7244-4: 1999, and specifically, the loss tangent (tan δ) may be determined using, for example, an enforced stretching vibration type viscoelasticity meter such as "Vibron" available from ORIENTEC Co., LTD under a condition involving a rate of temperature rise of 2° C./min and a frequency of 8 Hz.

(b) Blocked Isocyanate

The blocked isocyanate (b) is a compound prepared by blocking isocyanate groups of a polyisocyanate with a blocking agent. The polyisocyanate is a compound having at least two isocyanate groups in one molecule. The blocking agent is a compound which is added to an isocyanate group, and is stable at a normal temperature, but can regenerate a free isocyanate group upon heating at a temperature higher than the dissociation temperature.

Examples of the polyisocyanate include:

aliphatic polyisocyanates such as hexamethylene diisocyanate (HDI), 2,2,4-trimethylhexane diisocyanate and lysine diisocyanate;

alicyclic polyisocyanates such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidenedicyclohexyl-4,4'-diisocyanate, 1,3-di(isocyanatomethyl)cyclohexane (hydrogenated XDI), 1-methylcyclohexan-2,4-diyldiisocyanate (hydrogenated TDI) and 2,5- or 2,6-bis(isocyanatomethyl)-bicyclo[2.2.1]heptane(norbornane diisocyanate);

aromatic polyisocyanates such as tolylene diisocyanate (TDI), diphenylmethane diisocyanate (MDI), p-phenylene diisocyanate and naphthalene diisocyanate;

aromatic-aliphatic polyisocyanates such as xylylene diisocyanate (XDI) and tetramethylxylylene diisocyanate (TMXDI);

modified products (urethanated products, carbodiimides, uretdiones, uretoneimines, burettes and/or isocyanurate-modified products) of these polyisocyanates; and the like. These polyisocyanates may be used either alone of one type, or two or more types thereof may be used in combination.

Examples of the blocking agent include:

lactam-based blocking agents such as ε-caprolactam, δ-valerolactam, γ-butyrolactam and β-propiolactam;

glycol ether-based blocking agents, e.g., ethylene glycol monoalkyl ether-based blocking agents such as ethylene glycol monomethyl ether, ethylene glycol monoethyl ether, ethylene glycol monobutyl ether, diethylene glycol monomethyl ether and ethylene glycol mono-2-ethylhexyl ether;

propylene glycol monoalkyl ether-based blocking agents such as propylene glycol monomethyl ether and propylene glycol monoethyl ether; and the like.

As the blocking agent, other active hydrogen-containing blocking agent may be used in combination, in addition to the lactam-based blocking agent and the glycol ether-based blocking agent.

Examples of the other active hydrogen-containing blocking agent include:

phenol-based blocking agents such as phenol, cresol, xylenol, chlorophenol and ethylphenol;

active methylene-based blocking agents such as ethyl acetoacetate and acetylacetone;

alcohol-based blocking agents such as methanol, ethanol, propanol, butanol, amyl alcohol, benzyl alcohol, methyl glycolate, butyl glycolate, diacetone alcohol, methyl lactate, ethyl lactate and 2-ethylhexanol;

oxime-based blocking agents such as formaldoxime, acetoaldoxime, acetoxime, methylethylketoxime, diacetyl-monooxime and cyclohexaneoxime;

mercaptan-based blocking agents such as butyl mercaptan, hexyl mercaptan, t-butyl mercaptan, thiophenol, methylthiophenol and ethylthiophenol;

acid amide-based blocking agents such as acetic acid amide and benzamide;

imide-based blocking agents such as succinic acid imide and maleic acid imide;

imidazole-based blocking agents such as imidazole and 2-ethylimidazole;

pyrazole-based blocking agents;

triazole-based blocking agents; and the like.

An equimolar blocking agent to the isocyanate groups of the polyisocyanate is generally used in the preparation of the blocked isocyanate.

The blocked isocyanate is preferably HDI blocked with the oxime-based blocking agent or the pyrazole-based blocking agent.

The lower limit of the percentage content of the blocked isocyanate (b) in the entire resin components is 20% by mass, preferably 25% by mass, and more preferably 30% by mass. The upper limit of the percentage content is 60% by mass, preferably 45% by mass, and more preferably 40% by mass. When the percentage content is less than the lower limit described above, the hardness and/or the adhesiveness of the coating film may be decreased. To the contrary, when the percentage content is greater than the upper limit described above, the chipping resistance may be inferior.

The lower limit of a molar ratio of the isocyanate groups of the blocked isocyanate (b) to OH groups of the polycaprolactonetriol (a) (hereinafter, may be also referred to as "NCO/OH ratio") is preferably 0.5, more preferably 0.6, and still more preferably 0.8. The upper limit of the NCO/OH ratio is preferably 2.5, more preferably 1.8, and still more preferably 1.5. When the NCO/OH ratio is less than the lower limit described above, the hardness and/or the adhesiveness of the coating film may be decreased. To the contrary, when the NCO/OH ratio is greater than the upper limit described above, the appearance may be deteriorated. In addition, the NCO/OH ratio falling within the above range enables the tensile strength value at a low temperature to be optimized, and is effective in decreasing a flaking area upon chipping.

(c) Melamine Resin

The melamine resin (c) is a thermosetting resin which is synthesized from melamine and an aldehyde. The melamine resin (c) is exemplified by a methylated melamine resin, a butylated melamine resin, a methylated/butylated melamine resin, and the like.

As the melamine resin (c), a commercially available product may be also used. Examples of the commercially available product of the melamine resin (c) include "CYMEL 303" and "CYMEL 254" available from Japan Cytec Ltd., "U-VAN 128" and "U-VAN 20N60" available from Mitsui Chemicals, Inc., "SUMIMAL series" available from Sumitomo Chemical Co., Ltd., and the like.

The lower limit of the percentage content of the melamine resin (c) in the entire resin components is 1% by mass, preferably 1.5% by mass, and more preferably 2.5% by mass. On the other hand, the upper limit of the percentage content is 20% by mass, preferably 17% by mass, and more preferably 15% by mass. When the percentage content is less than the lower limit described above, the hardness of the coating film may be decreased in baking at a low temperature. To the contrary, when the percentage content is greater than the upper limit described above, chipping resistance becomes inferior, and thus flaking of the coating film may be caused.

(d) Talc

The talc (d) plays a role as a pigment. The talc (d) is not particularly limited, and well-known talc such as S talc and PS talc are exemplified.

The mean particle size of the talc (d) is typically no less than 1 μm and no greater than 10 μm, and preferably about 5 μm. When the mean particle size falls within the above range, deterioration of the appearance of the coating film can be more inhibited. When the mean particle size is less than 1 μm, the effect of improving the chipping resistance by the talc may be insufficient. To the contrary, when the mean particle size exceeds 10 μm, the appearance may be deteriorated. It is to be noted that the mean particle size of the talc (d) is a median diameter derived from the volume distribution determined according to a laser diffraction scattering method.

The lower limit of the pigment mass concentration of the talc (d) is 1% by mass, preferably 1.5% by mass, and more preferably 2% by mass. The upper limit of the pigment mass concentration is 10% by mass, preferably 6% by mass, and more preferably 4.5% by mass. When the pigment mass concentration is less than the lower limit described above, the chipping resistance will be inferior, and thus flaking of the coating film may be caused. To the contrary, when the pigment mass concentration is greater than the upper limit described above, the adhesiveness of the coating film may be decreased. In addition, the amount remaining after heating (NV: Non Volatiles) of the intermediate coating composition is reduced, and thus the smoothness may be deteriorated.

(e) Epoxy Resin

The epoxy resin (e) is a resin having an epoxy group. When the intermediate coating composition contains an epoxy resin, the chipping resistance and water resistance of the coating film can be further improved. The epoxy resin (e) is exemplified by a bisphenol type epoxy resin obtained by a reaction of bisphenol with epichlorohydrin, and the like. Examples of the bisphenol include bisphenol A, bisphenol F, and the like. Examples of the commercially available product of the bisphenol type epoxy resin include "Epicoat 828", "Epicoat 1001", "Epicoat 1004", "Epicoat 1007" and "Epicoat 1009" available from Shell Chemical Co., and the like. Alternatively, these epoxy resins subjected to chain extension using a chain extender may be also used as the epoxy resin (e).

The percentage content of the epoxy resin (e) in the entire resin components is preferably greater than 0% by mass. Further, the lower limit of the percentage content is more preferably 5% by mass. The upper limit of the percentage content is more preferably 10% by mass. When the percentage content is less than the lower limit described above, the dynamic Tg of the coating film is elevated, and thus the chipping resistance may be insufficient. To the contrary, when the percentage content is greater than the upper limit described above, curability at low temperatures may be impaired.

(f) Polyester Resin

The polyester resin (f) is a resin having an ester bond in the main chain, but those corresponding to the polycaprolactonetriol (a) are excluded. When the intermediate coating composition contains a polyester, suitability for paint application, and the dispersibility of the pigment can be improved. The polyester resin (f) is exemplified by a saturated polyester, an unsaturated polyester, and the like. Such a polyester resin (f) may be obtained by, for example, heat condensation of a polybasic acid with a polyhydric alcohol. The polybasic acid is exemplified by a saturated polybasic acid or an anhydride thereof, an unsaturated polybasic acid or an anhydride thereof, and the like. Examples of the saturated polybasic acid and the anhydride thereof include phthalic anhydride, terephthalic acid, succinic acid, and the like. Examples of the unsaturated polybasic acid and the anhydride thereof include maleic acid, maleic anhydride, fumaric acid, and the like. The polyhydric alcohol is exemplified by a divalent alcohol, a trivalent alcohol, and the like. Examples of the divalent alcohol include ethylene glycol, diethylene glycol, and the like. Examples of the trivalent alcohol include glycerin, trimethylolpropane, and the like.

The lower limit of the number average molecular weight of the polyester resin (f) is preferably 500, and more preferably 800. The upper limit of the number average molecular weight is preferably 6,000, and more preferably 5,000.

The lower limit of the percentage content of the polyester resin (f) in the entire resin components is preferably 20% by mass, and more preferably 35% by mass. The upper limit of the percentage content is preferably 70% by mass, and more preferably 55% by mass.

(g) Urethane Curing Catalyst

The urethane curing catalyst (g) is a substance that promotes a reaction producing a urethane bond between the blocked isocyanate (b), and the polycaprolactonetriol (a) and the melamine resin (c). The urethane curing catalyst (g) is exemplified by a bismuth-based compound, an aluminum-based compound, a tin-based compound, a zinc-based compound, and the like.

Examples of the bismuth-based compound include bis(acetylacetone)bismuth, bismuth 2-ethylhexanoate, bismuth neodecanate, bismuth salicylate, and the like.

Examples of the aluminum-based compound include aluminum triacetylacetonate, aluminum triacetoacetate, and the like.

Examples of the tin-based compound include dimethyltin dilaurate, dibutyltin dilaurate, dimethyltin chloride, dibutyltin chloride, di-n-octyltin dilaurate, and the like.

Examples of the zinc-based compound include zinc acetylacetonate, zinc propionate, zinc octanoate, zinc 2-ethylhexanoate, zinc neodecanoate, zinc laurate, zinc stearate, zinc linolate, zinc naphthenate, zinc benzoate, zinc salicylate, and the like.

The content of the urethane curing catalyst (g) with respect to 100 parts by mass of the entire resin components is preferably greater than 0.01 parts by mass. In addition, the lower limit of the content is preferably 0.02 parts by mass, and more preferably 0.2 parts by mass. The upper limit of the content is preferably 2 parts by mass, and more preferably 1 part by mass. When the content is less than the lower limit described above, the curability at low temperatures may be impaired. To the contrary, when the content is greater than the upper limit described above, the appearance of the coating film may be deteriorated.

Other Optional Components

The other optional component is exemplified by: as resin components, resins other than the component (a) to the component (c), the component (e) and the component (f); a pigment component other than the component (d); an anti-settling agent, and the like.

Examples of the other resin include polymers such as polyols other than the component (a), acrylic resins, and the like.

Examples of the other pigment component include: inorganic pigments such as titanium white, carbon black and iron oxide; various types of organic pigment; extender pigments such as sedimentary barium sulfate; and the like. The lower limit of the pigment mass concentration of the other pigment component is preferably 20% by mass, and more preferably 30% by mass. The upper limit of the pigment mass concentration is preferably 70% by mass, and more preferably 60% by mass. Accordingly, the strength, weather resistance and the like of the intermediate coating layer can be improved, thereby enabling the chipping resistance to be enhanced. The anti-settling agent is exemplified by a well-known anti-settling agent such as a polyethylene-based anti-settling agent, a polyamide-based anti-settling agent, and the like.

In addition, the intermediate coating composition may be used as any one of a water-based paint and an organic solvent-based paint. In a case where the intermediate coating composition is used as an organic solvent-based paint, one, or two or more types of organic solvents such as: aromatic hydrocarbons such as toluene and xylene; aliphatic hydrocarbons such as mineral spirit; esters such as ethyl acetate and butyl acetate; ketones such as methyl ethyl ketone may be contained as an organic solvent.

Multilayered Coating Film-Forming Method

The multilayered coating film-forming method according to the embodiment of the present invention may be applied to formation of outer panels of automobiles, as well as other outer panels of e.g., motor cycles, fork-lift trucks and heavy equipment, automobile accessories, and the like for which chipping resistance is required. Hereinafter, the multilayered coating film-forming method will be explained with reference to a method for forming a multilayered coating film constructing an outer panel of an automobile, by way of an example. However, the multilayered coating film-forming method is not limited to the method described below.

The multilayered coating film-forming method according to the embodiment of the present invention includes: an electrodeposition coating layer-forming step; an intermediate coating layer forming-step; and a top coating layer-forming step.

Electrodeposition Coating Layer-Forming Step

The electrodeposition coating layer-forming step can be accomplished by carrying out well-known electrodeposition paint application, followed by baking.

Electrodeposition Paint Application

The electrodeposition paint application is a procedure in which a material to be coated is immersed in an electrodeposition paint, and electrification therebetween leads to deposition of a charged resin component onto the material to be coated.

As the material to be coated, a steel plate or the like may be used. Also, prior to carrying out the electrodeposition paint application onto the material to be coated, plating or chemical conversion coating may be conducted onto the material to be coated, and it is preferred that the chemical conversion coating is conducted after conducting the plating onto the material to be coated. The chemical conversion coating is exemplified by a procedure in which an iron phosphate/zinc phosphate chemical conversion coating agent is used. The plating is exemplified by a zinc plating, and the like.

The electrodeposition paint is a water soluble paint or water dispersion type paint prepared by dissolving or dispersing the resin component in water. In the case where the resin component is an acidic resin, the electrodeposition paint may be prepared by neutralizing with a base such as ammonia, an amine or an inorganic alkali, and the neutralized matter is dissolved or dispersed in water. On the other hand, in the case where the resin component is a basic resin, the electrodeposition paint may be prepared by neutralizing with an acid such as acetic acid, lactic acid, boric acid or phosphoric acid, and the neutralized matter is dissolved or dispersed in water.

As the electrodeposition paint, any one of an anionic resin-based paint and a cationic resin-based paint may be used, and a cationic resin-based paint is preferred in light of an anticorrosion property.

Examples of the resin component of the electrodeposition paint include: drying oil; liquid rubber-based resins such as polybutadiene; maleinized oil resins; maleinized polybutadiene; amine epoxidized polybutadiene; fatty acid ester resins of a resinous polyol, or modified derivatives thereof (for example, epoxidation products, esterification products); alkyd resins; acrylic resins; and the like.

The electrodeposition paint may be appropriately blended with a conventionally employed additive such as a cross-linking agent such as a melamine resin and a blocked isocyanate, a pigment, a solvent, and the like.

The condition of the electrodeposition paint application is preferably predetermined so as to give the film thickness of the electrodeposition coating layer of no less than 10 μm and no greater than 40 μm after baking as described later, and typically involves an application voltage of no less than 200 V and no greater than 300 V, and an application time period of no less than 90 sec and no greater than 300 sec. As a matter of course, the condition of the electrodeposition paint application may be appropriately predetermined in accordance with the type of the electrodeposition paint used, intended film thickness of the deposition film, and the like. It is to be noted that the "film thickness" as referred to means a value determined in accordance with JIS-K5600-1-7: 1999 ("Testing methods for paints—Part 1: General rule—Section 7: Determination of film thickness"). The same applies to the "film thickness" as referred to herein below.

Baking

The baking after the electrodeposition paint may be carried out in accordance with a conventional method as long as the resin component in the electrodeposition paint can be fixed to the material to be coated.

Intermediate Coating Layer-Forming Step

The intermediate coating layer-forming step can be executed by directly applying the intermediate coating paint onto the surface of the electrodeposition coating layer, and then as needed, baking.

As the intermediate coating paint, the intermediate coating composition described above may be used. The intermediate coating composition may be used either directly as the intermediate coating paint, or after diluting in a solvent to prepare an intermediate coating paint. The intermediate coating composition contains the polycaprolactonetriol (a), the blocked isocyanate (b), the a melamine resin (c) and the talc (d), as well as favorable components such as the epoxy resin (e) and the polyester resin (f) as resin components, or the urethane curing catalyst (g) as other component. Details of the intermediate coating composition are as described above; therefore, redundant explanations are omitted in this respect.

Application of the intermediate coating paint is usually carried out such that the intermediate coating layer after drying has a film thickness of no less than 5 μm and no greater than 60 μm. Such an application of the intermediate coating paint may be conducted using a well-known coater such as a spray type paint applicator, or the like. Examples of the spray type paint applicator include air spray paint applicators, airless spray paint applicators, air spray type electrostatic paint applicators, rotational electrostatic paint applicators, and the like.

Baking after the application of the intermediate coating paint may be carried out in accordance with a conventional method. The baking is preferably carried out under conditions involving, for example, the baking temperature of no less than 130° C. and no greater than 160° C., and the baking time period of no less than 10 min and no greater than 60 min. In addition, the baking in the intermediate coating layer-forming step may be omitted, and a top coating paint as described later may be applied onto the intermediate coating paint by a wet-on-wet system.

Top Coating Layer-Forming Step

The top coating layer-forming step may be executed by applying the top coating paint on the intermediate coating layer (or intermediate coating paint), followed by baking.

In the top coating layer-forming step, when formation of a monolayer of only a base layer is intended, the top coating paint is applied, and thereafter baking is carried out In this instance, the top coating paint which may be used is any well-known top coating solid paint that contains, for example, a resin component such as an acrylic resin, a polyester resin or a fluorocarbon resin, a coloring pigment, and the like. The film thickness of the top coating layer of the monolayer after baking is typically no less than 2 μm and no greater than 60 μm.

In addition, when the top coating layer is formed to have two layers, the clear paint is applied by a wet-on-wet system after the application of the solid paint, and the baking of the solid paint and the clear paint is concurrently carried out.

It is to be noted that when the baking is not carried out in the intermediate coating layer-forming step, the intermediate coating paint is concurrently baked during the baking in the top coating layer-forming step. The baking is preferably carried out under conditions involving, for example, the baking temperature of no less than 130° C. and no greater than 160° C., and the baking time period of no less than 10 min and no greater than 60 min.

According to such a multilayered coating film-forming method, the intermediate coating layer is formed using the intermediate coating composition; therefore, even if a chipping-resistant primer is not applied, a multilayered coating film capable of ensuring the chipping resistance can be formed.

Multilayered Coating Film

The multilayered coating film according to the embodiment of the present invention is formed on a material to be coated constructing a vehicle outer panel. The multilayered coating film includes an electrodeposition coating layer formed on the surface of the material to be coated, an intermediate coating layer directly overlaid on the surface of the electrodeposition coating layer, and a top coating layer overlaid on the surface of the intermediate coating layer. The multilayered coating film is applicable to outer panels of automobiles, as well as other outer panels of motor cycles, fork-lift trucks and heavy equipment, automobile accessories, and the like for which chipping resistance is required.

Material to be Coated

The material to be coated is not particularly limited, and may be selected depending on an intended usage of the plate to be painted, and the like. For example, when the plate to be painted is an outer panel of automobiles, the material to be coated is exemplified by steel plates, and steel plates which had been subjected to plating with zinc, etc., and/or to chemical conversion coating. The material to be coated for outer panels of automobiles is preferably one which had been subjected to plating, followed by chemical conversion coating.

Electrodeposition Coating Layer

The electrodeposition coating layer is provided predominantly for ensuring an anticorrosion property. The constitution and the like of the electrodeposition coating layer may be selected depending on the characteristics and the like required for the vehicle outer panels.

Examples of the principal component of the electrodeposition coating layer include: drying oils, liquid rubber-based resins such as polybutadiene, maleinized oil resins, maleinized polybutadiene, amine epoxidized polybutadiene; fatty acid ester resins of a resinous polyol, or modified derivatives thereof (for example, epoxidation products and esterification products); alkyd resins; acrylic resins; and the like.

The electrodeposition coating layer may contain well-known additive(s) such as a melamine resin, a crosslinking agent such as a blocked isocyanate, a pigment, and the like.

The film thickness of the electrodeposition coating layer is typically no less than 10 μm and no greater than 40 μm. When the film thickness of the electrodeposition coating layer falls within such a range, the anticorrosion property can be suitably ensured.

Intermediate Coating Layer

The intermediate coating layer is provided predominantly for ensuring smoothness and chipping resistance. The intermediate coating layer is formed by using the intermediate coating composition described above. In other words, the intermediate coating layer contains the polycaprolactonetriol (a), the blocked isocyanate (b), the melamine resin (c) and the talc (d). The intermediate coating layer may further contain an epoxy resin, a polyester resin, a urethane curing catalyst and the like. The percentage content or the content of these components preferably falls within the range similar to the range as described above in connection with the intermediate coating composition. In addition, the intermediate coating layer may also contain a coloring pigment for exhibiting a designed feature, in combination with the top coating layer.

The film thickness of the intermediate coating layer is preferably no less than 5 μm and no greater than 60 μm. When the film thickness of the intermediate coating layer is less than 5 μm, the smoothness and chipping resistance may not be ensured. On the other hand, when the film thickness of the intermediate coating layer is greater than 60 μm, the paint in the intermediate coating layer and the paint in the top coating layer are admixed with each other in a case where, for example, the top coating layer is formed according to a wet-on-wet system, and thus the smoothness may not be ensured.

Top Coating Layer

The top coating layer is provided predominantly for ensuring the smoothness and corrosion resistance, and as needed, gives a multicolored pattern, whereby visual effects such as an optical effect are achieved.

The top coating layer may be formed either as a monolayer or a multilayer. The number of layers of the top coating layer may be selected depending on the intended usage and the like of the plate to be painted. For example, in the case of outer panels of automobiles, the number of layers of the top coating layer may be generally either one or two.

When the top coating layer is formed as a monolayer, the top coating layer contains, for example, a resin component, a coloring pigment, and/or the like. The resin component is exemplified by a resin blended into a well-known top coating solid paint such as e.g., an acrylic resin, polyester resin, a fluorocarbon resin, and the like. The coloring pigment is appropriately selected from well-known coloring pigments. The film thickness of the top coating layer is typically no less than 2 µm and no greater than 60 µm.

When the top coating layer is formed as a bilayer, the top coating layer includes, for example, a base layer and a clear layer. The base layer is fundamentally similar to the top coating layer of the monolayer. The clear layer is transparent layer, and protects the base layer. This clear layer contains, for example, a fluorocarbon resin, as a resin component.

According to such a multilayered coating film, since the intermediate coating layer is formed by using the intermediate coating composition, the chipping resistance can be ensured even if the chipping-resistant primer is not applied.

EXAMPLES

Hereinafter, embodiments of the present invention will be explained in more detail by way of Examples, but the present invention is not in any way limited by these Examples. It is to be noted that, in Examples below, the term "part" means "part by mass".

Preparation of Intermediate Coating Composition

Each component for use in the preparation of the intermediate coating compositions of Examples and Comparative Examples is shown below.

(a) Component polycaprolactonetriol: "PLACCEL L320AL" available from Daicel Chemical Industries, Ltd.

(b) Component blocked isocyanate A: "Desmodur BL3175A", available from Bayer AG blocked isocyanate B: "Desmodur PL350 MPA/SN", available from Bayer AG (c) Component melamine resin: "CYMEL 202", available from Japan Cytec Industries Ltd.

(d) Component talc: "LMR-100", available from Fuji Talc Industrial Co., Ltd.

(e) Component epoxy resin: "DER-331", available from Dow Chemical Japan Ltd.

(f) Component polyester resin A: a polyester resin synthesized in the following Production Example 1 polyester resin B: a polyester resin synthesized in the following Production Example 2

Other Resin Component polycaprolactonediol: "PLACCEL 205", available from Daicel Chemical Industries, Ltd.

(g) Component urethane curing catalyst: "K-KAT348", available from King Industries, Inc.

Other Pigment Components titanium white: "Titanium CR97", available from Ishihara Sangyo Kaisha, Ltd.

carbon black: "Carbon MA-100", available from Mitsubishi Chemical Corporation sedimentary barium sulfate: "BARTEX OWT", available from TOR MINERALS international Inc.

Production Example 1

Synthesis of Polyester Resin A

Into a reaction chamber equipped with a thermometer, a stirrer, a condenser, a nitrogen inlet tube, a water separator and a rectifying column, 45.5 parts of isophthalic acid, 17.1 parts of adipic acid, 10.0 parts of trimethylolpropane, 35.9 parts of neopentyl glycol, 5.0 parts of versatic acid glycidyl ester ("Cardura E", available from Shell Chemical Co., Ltd.), and 0.3 parts of dibutyltin oxide were charged, and the mixture was heated to elevate the temperature to 210° C. In this procedure, within the temperature range of from 160° C. to 210° C., the temperature was elevated over 3 hrs at a constant rate of temperature rise. Thus produced condensation water was distilled away outside the system. When the temperature of the reaction chamber reached 210° C., the temperature was maintained. After the incubation for 1 hour, 47.8 parts of isobutyl acetate were gradually added as a reflux solvent into the reaction chamber so as to proceed the reaction after switching to condensation in the presence of a solvent. Thereafter, the reaction chamber was cooled to 150° C., and 11.4 parts of ε-caprolactone were added. The mixture was incubated at 150° C. for 2 hrs, and then cooled to 100° C. Accordingly, a varnish was obtained in which a number average molecular weight was 3,050, an acid value was 8.0 mg KOH/g (solid content), a hydroxyl value was 92 mg KOH/g (solid content) and a nonvolatile matter content was 75%. It is to be noted that the number average molecular weight (Mn) was measured on gel permeation chromatography (GPC), and determined by a conversion using the polystyrene molecular weight as a standard.

Production Example 2

Synthesis of Polyester Resin B

Into a reaction chamber equipped with a thermometer, a stirrer, a condenser, a nitrogen inlet tube, a water separator and a rectifying column, 18.4 parts of isophthalic acid, 7.2 parts of hydroxypivalic acid neopentyl glycol ester, 21.3 parts of trimethylolpropane, 18.0 parts of neopentyl glycol, 25.8 parts of hexahydrophthalic anhydride, 9.4 parts of versatic acid glycidyl ester ("Cardura E", available from Shell Chemical Co., Ltd.), and 0.02 parts of dibutyltin oxide were charged, and the mixture was heated to elevate the temperature to 210° C. In this procedure, within the temperature range of from 160° C. to 210° C., the temperature was elevated over 3 hrs at a constant rate of temperature rise. Thus produced condensation water was distilled away outside the system. When the temperature of the reaction chamber reached 210° C., the temperature was maintained. After the incubation for 1 hour, 26.4 parts of isobutyl acetate were gradually added as a reflux solvent into the reaction chamber so as to proceed the reaction after switching to condensation in the presence of a solvent. Thereafter, the reaction chamber was cooled to 150° C., and 11.4 parts of ε-caprolactone were added. The mixture was incubated at 150° C. for 2 hrs, and then cooled to 100° C. Accordingly, a varnish was obtained in which a number average molecular weight was 1,310, an acid value was 8.7 mg KOH/g (solid content), a hydroxyl value was 210 mg KOH/g (solid content) and a nonvolatile matter content was 78.5%. It is to be noted that the number average molecular weight (Mn) was measured on gel permeation chromatography (GPC), and determined by a conversion using the polystyrene molecular weight as a standard.

Example 1

As resin components: 6% by mass (percentage content in entire resin solid components) of the polycaprolactonetriol as the component (a); 20% by mass (percentage content in entire resin solid components) of the blocked isocyanate A and 8.6% by mass (percentage content in entire resin solid components) of the blocked isocyanate B as the components (b); 15% by mass (percentage content in entire resin solid components) of the melamine resin as the component (c); 7.5% by mass (percentage content in entire resin solid components) of the epoxy resin as the component (e); and 21.3% by mass (percentage content in entire resin solid components) of the polyester resin A and 21.6% by mass (percentage content in entire resin solid components) of the polyester resin B as the components (f), 3% by mass (pigment mass concentration) of the talc as the component (d), 34.75% by mass (pigment mass concentration) of the titanium white, 0.02% by mass (pigment mass concentration) of the carbon black and 13.9% by mass (pigment mass concentration) of the sedimentary barium sulfate as other pigment components, and 0.25 parts by mass (content with respect to 100 parts by mass of the entire resin solid components) of the urethane curing catalyst as the component (g) were mixed, and the mixture was stirred to prepare the intermediate coating composition of Example 1. In this procedure, the molar ratio (NCO/OH ratio) of NCO groups in the component (b) to OH groups in the component (a) is 0.8.

Examples 2 to 6 and Comparative Examples 1 to 10

Intermediate coating compositions of Examples 2 to 6 and Comparative Examples 1 to 10 were prepared in a similar manner to Example 1 except that each component of the type and the amount shown in Table 1 below was employed. The value of the NCO/OH ratio in the preparation of each intermediate coating composition is also shown in Table 1 together.

Formation of Multilayered Coating Film

Multilayered coating films were formed using the intermediate coating compositions of Examples 1 to 6 and Comparative Examples 1 to 10 in accordance with the following method.

A GA steel plate (alloyed melt zinc-plated steel plate) was subjected to electrodeposition paint application with a cation electrodeposition coating composition ("POWER NICS® 1010", available from Nippon Paint Co., Ltd.) such that the dry coating film had a thickness of 15 μm, and heated at 170° C. for 20 min and thereafter cooled to form a cured electrodeposition coating layer.

Subsequently, on the cured electrodeposition coating layer, paint application was executed so as to give the film thickness of 35 μm by an air spray paint application with the intermediate coating composition at room temperature, and then curing was allowed at 140° C. for 30 min. On the intermediate coating film, paint application was executed so as to give the film thickness of 15 μm by an air spray paint application with a base coating composition ("Aquarex AR-2000", available from Nippon Paint Co., Ltd.) as the top coating composition, and then preheating was carried out at 80° C. for 3 min. Furthermore, on the coating film of the base coating composition, paint application was executed so as to give the film thickness of 35 μm by an air spray paint application with a clear coating composition ("MACFLOW O-1830", available from Nippon Paint Co., Ltd.) as the top coating composition, and then heat curing was carried out at 140° C. for 30 min to obtain a test piece having a multilayered coating film.

It is to be noted that the intermediate coating composition, the base coating composition and the clear coating composition were employed for the paint application after diluting to give a certain viscosity using the dilution solvent described below.

Intermediate Coating Composition

Using a mixed solvent of isobutyl acetate and n-pentyl propionate with a volume ratio of 1:1 as the dilution solvent, the dilution was carried out such that the viscosity (20° C.) as indicated by the measurement with a Ford Cup Viscometer (cup No. 4) was 35 sec.

Top Coating Composition

Base Coating Composition

Using ion exchanged water as the dilution solvent, the dilution was carried out such that the viscosity (20° C.) as indicated by the measurement with a Ford Cup Viscometer (cup No. 4) was 45 sec.

Clear Coating Composition

Using a mixed solvent of EEP (ethoxyethyl propionate) and S150 (aromatic hydrocarbon solvent available from Exxon Corporation) with a volume ratio of 1:1 as the dilution solvent, the dilution was carried out such that the viscosity (20° C.) as indicated by the measurement with a Ford Cup Viscometer (cup No. 4) was 28 sec.

Evaluations

Intermediate coating compositions of Examples 1 to 6 and Comparative Examples 1 to 10, and test pieces having an intermediate coating layer formed using these intermediate coating compositions were evaluated in accordance with the following methods. The results of the evaluations are shown in Table 1 together.

Chipping Resistance

Using a Gurabero tester (Suga Test Instruments Co., Ltd.), 300 g of No. 6 crushed stones were allowed to collide onto the multilayered coating film of the test piece at an angle of 90° from a point a distance of 35 cm away, with an air pressure of 5 kgf/cm². After washing with water and drying, flaking coating film pieces were removed by using a gummed kraft paper tape for industrial use (Nichiban Co., Ltd.), and then the extent of the flaking of the coating film was visually observed. The chipping resistance was evaluated based on the following evaluation criteria in view of the state of the flaking of the coating film and the zinc plating layer. In the following six-grade rating, evaluations A and B were decided to be acceptable.

A: excellent (not any flaking of the coating film being found);

B: favorable (flaking of the coating film being slightly found);

C: normal (flaking of no greater than 1 mmφ of the coating film being frequently found);

D: somewhat unfavorable (flaking of the coating film being remarkable);

E: unfavorable (the area of flaking of the coating film being great); and

F: zinc plating layer being flaking

Curability at Low Temperature

The intermediate coating paint was applied on a polypropylene plate with a bar coater so as to give a dry film thickness of 40 μm, and thereafter heat curing was allowed at 130° C. for 30 min to form an intermediate coating film. A single coating film yielded by flaking the intermediate coating film away from the polypropylene plate was subjected to reflux of acetone with heating in a Soxhlet extractor. The coating film mass was measured before and after the reflux for 3 hrs, and the gel fraction was determined according to the following formula:

gel fraction(%)=(mass of the coating film after the extraction/mass of the coating film before the extraction)×100.

The curability at low temperatures was evaluated based on the following criteria. In the following five-grade rating, evaluations A and B were decided to be acceptable.

A: gel fraction being no less than 95%;
B: gel fraction being no less than 90% and less than 95%;
C: gel fraction being no less than 85% and less than 90%;
D: gel fraction being no less than 80% and less than 85%; and
E: gel fraction being less than 80%

Single Film Hardness

With respect to the intermediate coating film produced for the low-temperature curability test, pencil hardness was measured in accordance with JIS-K-5600-5-4: 1999 "pencil scratch hardness" using "Hi-uni" available from Mitsubishi Pencil Co., Ltd. The single film hardness was evaluated based on the following criteria. In the following three-grade rating, evaluations A and B were decided to be acceptable.

A: B or harder;
B: 2B; and
C: 3B or softer

Appearance

The appearance of the surface of the coating film was visually evaluated based on the following criteria. In the following three-grade rating, evaluations A and B were decided to be acceptable.

A: favorable smoothness;
B: somewhat unfavorable smoothness; and
C: unfavorable smoothness;

NV Evaluation

After the measurement of the mass of the intermediate coating composition (about 1 g), this sample was dried in an oven at 110° C. for 60 min. Subsequently, the mass of the intermediate coating composition after the drying was measured. The value derived by: dividing the mass of the sample after drying by the mass of the sample before drying; and multiplying the product of the division by 100 was determined by the solid content concentration (%) (NV).

NV was evaluated based on the following criteria. In the following three-grade rating, evaluations A and B were decided to be acceptable.

A: no less than 60%;
B: no less than 50% and less than 60%; and
C: less than 50%

TABLE 1

| Resin components (*1) | | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|---|---|---|
| | (a) component polycaprolactonetriol | 6 | 6 | 9 | 7 | 6 | 6 | 0 | 28 | 0 | 6 | 2 | 6 | 6 | 6 | 6 | 6 |
| | (b) component blocked isocyanate A | 20 | 27.2 | 24.5 | 23.8 | 20 | 20 | 20 | 10.1 | 20 | 6 | 30 | 20 | 13.6 | 20 | 20 | 0 |
| | blocked isocyanate B | 8.6 | 11.6 | 10.5 | 10.2 | 16.1 | 8.6 | 11.6 | 5 | 4.6 | 0 | 24.1 | 19.5 | 0 | 8.6 | 8.6 | 0 |
| | (c) component melamine resin | 15 | 5 | 5 | 5 | 15 | 15 | 15 | 10 | 15 | 40 | 0 | 0 | 30 | 15 | 15 | 40.5 |
| | (e) component epoxy resin | 7.5 | 6.5 | 7.5 | 10 | 0 | 7.5 | 7.5 | 4 | 7.5 | 5.1 | 1 | 7.5 | 7.5 | 7.5 | 7.5 | 10 |
| | (f) component poly ester resin A | 21.3 | 21.6 | 35 | 33.4 | 21.3 | 21.3 | 21.3 | 21.3 | 21.3 | 21.3 | 21.3 | 23.5 | 21.3 | 21.3 | 21.3 | 24.9 |
| | poly ester resin B | 21.6 | 22.1 | 8.5 | 10.6 | 21.6 | 21.6 | 24.6 | 21.6 | 21.6 | 21.6 | 21.6 | 23.5 | 21.6 | 21.6 | 21.6 | 18.6 |
| | polycaprolactonediol | 0 | 0 | 0 | 0 | 0 | 0 | 0 | 0 | 10 | 0 | 0 | 0 | 0 | 0 | 0 | 0 |
| Total mass of resin solid components | | 100 | 100 | 100 | 100 | 100 | 100 | 100 | 100 | 100 | 100 | 100 | 100 | 100 | 100 | 100 | 100 |
| Pigment component (*2) | (d) component talc | 3 | 3 | 3 | 3 | 3 | 3 | 3 | 3 | 3 | 3 | 3 | 3 | 3 | 0 | 15 | 3 |
| | titanium white | 34.75 | 31.97 | 5.45 | 37.1 | 34.75 | 34.75 | 34.75 | 34.75 | 34.75 | 34.75 | 34.75 | 34.75 | 34.75 | 34.75 | 34.75 | 34.75 |
| | carbon black | 0.02 | 0.2 | 1.24 | 0 | 0.02 | 0.02 | 0.02 | 0.02 | 0.02 | 0.02 | 0.02 | 0.02 | 0.02 | 0.02 | 0.02 | 0.02 |
| | sedimentary barium sulfate | 13.9 | 12.79 | 30.31 | 14.9 | 13.9 | 13.9 | 13.9 | 13.9 | 13.9 | 13.9 | 13.9 | 13.9 | 13.9 | 16.9 | 1.9 | 1.9 |
| Total pigment mass concentration | | 52 | 48 | 40 | 55 | 52 | 52 | 52 | 52 | 52 | 52 | 52 | 52 | 52 | 52 | 52 | 52 |
| (*3) | (g) urethane curing catalyst | 0.25 | 0.5 | 0.5 | 0.5 | 0.25 | 2.5 | 0.25 | 0.25 | 0.25 | 0.25 | 0.25 | 0.25 | 0.25 | 0.25 | 0.25 | 0 |
| Evaluations | NCO/OH ratio | 0.8 | 1 | 1.1 | 1.1 | 1 | 0.8 | 0.85 | 0.33 | 0.8 | 0.16 | 1.56 | 1 | 0.37 | 0.8 | 0.8 | — |
| | chipping resistance | A | A | A | A | B | B | D | A | E | E | A | B | D | D | C | F |
| | curability at low temperatures | A | A | A | A | A | A | A | E | B | B | B | C | C | A | C | A |
| | single film hardness | A | A | A | A | A | A | A | E | B | B | B | B | C | A | A | A |
| | appearance | A | B | A | A | A | B | A | A | A | A | C | B | A | A | C | A |
| | NV evaluation | A | A | B | B | A | A | A | A | A | A | A | A | A | A | C | A |

*1: percentage content in entire resin solid components (mass %)
*2: pigment mass concentration (mass %)
*3: content with respect to 100 parts by mass of the entire resin solid From the results shown in Table 1, it was indicated that the intermediate coating compositions of Examples 1 to 6 enable coating films having superior and well-harmonized chipping resistance and other characteristic features such as an appearance to be formed, without using a chipping-resistant primer. It is to be noted that the chipping resistance attained by Comparative Example 10 containing the melamine resin as the component (c) and not containing the blocked isocyanate as the component (b) is most inferior; therefore, it is revealed that a combination of the blocked isocyanate and the melamine resin improves the chipping resistance, as described above.

INDUSTRIAL APPLICABILITY

According to the intermediate coating composition, the coating film and the multilayered coating film-forming method of the embodiments of the present invention, a multilayered coating film having superior and well-harmonized chipping resistance and other characteristic features such as an appearance can be formed without using a chipping-resistant primer.

What is claimed is:

1. An intermediate coating composition for forming an intermediate coating layer directly on a surface of an electrodeposition coating layer of a vehicle outer panel,
    the intermediate coating composition comprising resin components and a pigment component,
    the resin components comprising:
    (a) a polycaprolactonetriol in an amount of no less than 1% by mass and no greater than 15% by mass;
    (b) a blocked isocyanate in an amount of no less than 20% by mass and no greater than 60% by mass; and
    (c) a melamine resin in an amount of no less than 1% by mass and no greater than 20% by mass,
    each at a percentage content in entire resin components, and
    the pigment component comprising:
    (d) talc in an amount of no less than 1% by mass and no greater than 10% by mass in terms of pigment mass concentration.

2. The intermediate coating composition according to claim 1, further comprising (e) an epoxy resin as the resin component in an amount of greater than 0% by mass and no greater than 10% by mass at the percentage content in the entire resin components.

3. The intermediate coating composition according to claim 1, further comprising (g) a urethane curing catalyst in an amount of greater than 0.01 parts by mass and no greater than 2 parts by mass with respect to 100 parts by mass of the entire resin components.

4. The intermediate coating composition according to claim 1, wherein the amount of the polycaprolactonetriol is no less than 5% by mass and no greater than 10% by mass at the percentage content in the entire resin components.

5. The intermediate coating composition according to claim 1, wherein the amount of the polycaprolactonetriol is no less than 5% by mass and no greater than 10% by mass, the amount of the blocked isocyanate is no less than 25% by mass and no greater than 40% by mass, and the amount of the melamine resin is no less than 2.5% by mass and no greater than 15% by mass, each at the percentage content in the entire resin components, and the amount of the talc is no less than 2% by mass and no greater than 4.5% by mass in terms of pigment mass concentration.

6. The intermediate coating composition according to claim 1, wherein a mean particle size of the talc is no less than 1 µm and no greater than 10 µm.

7. A multilayered coating film comprising:
    an electrodeposition coating layer of a vehicle outer panel;
    an intermediate coating layer directly on a surface of the electrodeposition coating layer; and
    a top coating layer on a surface of the intermediate coating layer, wherein
    the intermediate coating layer is a cured product of the intermediate coating composition according to claim 1.

8. The multilayered coating film according to claim 7, wherein the intermediate coating composition further comprises (e) an epoxy resin as the resin component in an amount of greater than 0% by mass and no greater than 10% by mass at the percentage content in the entire resin components.

9. The multilayered coating film according to claim 7, wherein the intermediate coating composition further comprises (g) a urethane curing catalyst in an amount of greater than 0.01 parts by mass and no greater than 2 parts by mass with respect to 100 parts by mass of the entire resin components.

10. The multilayered coating film according to claim 7, wherein the amount of the polycaprolactonetriol in the intermediate coating composition is no less than 5% by mass and no greater than 10% by mass at the percentage content in the entire resin components.

11. The multilayered coating film according to claim 7, wherein in the intermediate coating composition, the amount of the polycaprolactonetriol is no less than 5% by mass and no greater than 10% by mass, the amount of the blocked isocyanate is no less than 25% by mass and no greater than 40% by mass, and the amount of the melamine resin is no less than 2.5% by mass and no greater than 15% by mass, each at the percentage content in the entire resin components, and the amount of the talc is no less than 2% by mass and no greater than 4.5% by mass in terms of pigment mass concentration.

12. The multilayered coating film according to claim 7, wherein a mean particle size of the talc in the intermediate coating composition is no less than 1 µm and no greater than 10 µm.

13. A multilayered coating film-forming method comprising:
    forming an electrodeposition coating layer of a vehicle outer panel;
    forming an intermediate layer by applying the intermediate coating composition of claim 1 on a surface of the electrodeposition coating layer; and
    forming a top coating layer on a surface of the intermediate coating layer.

14. The multilayered coating film-forming method according to claim 13, wherein the intermediate coating composition further comprises (e) an epoxy resin as the resin component in an amount of greater than 0% by mass and no greater than 10% by mass at the percentage content in the entire resin components.

15. The multilayered coating film-forming method according to claim 13, wherein the intermediate coating composition further comprises (g) a urethane curing catalyst in an amount of greater than 0.01 parts by mass and no greater than 2 parts by mass with respect to 100 parts by mass of the entire resin components.

16. The multilayered coating film-forming method according to claim 13, wherein the amount of the polycaprolactonetriol in the intermediate coating composition is no less than 5% by mass and no greater than 10% by mass at the percentage content in the entire resin components.

17. The multilayered coating film-forming method according to claim 13, wherein in the intermediate coating composition, the amount of the polycaprolactonetriol is no less than 5% by mass and no greater than 10% by mass, the amount of the blocked isocyanate is no less than 25% by mass and no greater than 40% by mass, and the amount of the melamine resin is no less than 2.5% by mass and no greater than 15% by mass, each at the percentage content in the entire resin components, and the amount of the talc is no less than 2% by mass and no greater than 4.5% by mass in terms of pigment mass concentration.

18. The multilayered coating film-forming method according to claim 13, wherein a mean particle size of the talc in the intermediate coating composition is no less than 1 μm and no greater than 10 μm.

* * * * *